United States Patent
Mueller et al.

(10) Patent No.: US 6,209,895 B1
(45) Date of Patent: Apr. 3, 2001

(54) AXLE SUSPENSION SYSTEM FOR A WHEELED VEHICLE

(75) Inventors: Ray A. Mueller, Walnut Grove; Kim F. McGinnis, Springfield, both of MO (US)

(73) Assignee: Reyco Industries, Inc., Springfield, MO (US)

( * ) Notice: Subject to any disclaimer, the term of this patent is extended or adjusted under 35 U.S.C. 154(b) by 0 days.

(21) Appl. No.: 09/204,936

(22) Filed: Dec. 3, 1998

(51) Int. Cl.$^7$ .................................................. B60G 9/02
(52) U.S. Cl. .......................... 280/124.116; 280/124.128
(58) Field of Search .................... 280/124.116, 124.128, 280/124.153, 124.158, 678, 683

(56) References Cited

U.S. PATENT DOCUMENTS

| | | | |
|---|---|---|---|
| 2,352,446 | * 6/1944 | Pointer | 267/20 |
| 2,367,817 | 1/1945 | Brown | 180/73 |

(List continued on next page.)

FOREIGN PATENT DOCUMENTS

| | | |
|---|---|---|
| 650987 | 10/1962 | (CA) . |
| 3521856 | 1/1981 | (DE) . |
| 3333171 | 3/1985 | (DE) . |
| 1132451 | 3/1957 | (FR) . |
| 1140636 | 7/1957 | (FR) . |
| 2068856 | 8/1991 | (GB) . |
| 302468 | 10/1965 | (NL) . |

OTHER PUBLICATIONS

XD–1212 Blueprint of Prior Art Suspension Design of Turner QuickLift Corp.
XD–1213–2 Blueprint of Prior Art Suspension Design of Turner QuickLift Corp.
XD–1225–3 Blueprint of Prior Art Suspension Design of Turner QuickLift Corp.
XD–1242–5 Blueprint of Prior Art Suspension Design of Turner QuickLift Corp.

*Primary Examiner*—J. J. Swann
*Assistant Examiner*—J. Allen Shriver
(74) *Attorney, Agent, or Firm*—Cook, Alex, McFarron, Manzo, Cummings & Mehler, Ltd.

(57) ABSTRACT

An axle suspension system for a wheeled vehicle. This suspension system includes a trailing arm beam extending longitudinally along each side of the vehicle with each trailing arm beam connected to a resilient pivotal bushing at the forward end thereof. Each resilient pivotal bushing is mounted on a hanger attached to the vehicle frame. An air spring is attached to the rearward end of each trailing arm beam and connects its trailing arm beam to the wheeled vehicle. Each trailing arm beam has a U-shaped transverse cross-section wherein a horizontally extending wall is oppositely located relative to vertically extending walls to define a vertical facing opening in the trailing arm beam. A vehicle axle is connected to the trailing arm beams. The vehicle axle is attached to an axle thrust mounting located on the trailing arm beams and spanning the vertical facing openings thereof near the rearwardly located ends of the trailing arm beams. The axle thrust mounting includes an axle cradle mounted on the vertically extending walls of the trailing arm beams and extending transversely across the trailing arm beams. The axle cradle has side walls which seat in notches formed in the walls of the trailing arm beams with the axle cradle side walls extending laterally outwardly of the trailing arm beams on both sides thereof. Sponsons are attached to the outside walls of each of the trailing arm beams with the sponsons positioned adjacent the cradle axle. A wall is provided to close a portion of the vertical facing opening of each trailing arm beam to transmit stresses from the axle cradle to the pivotal bushing. A thrust transferring gusset is mounted on the closure wall of each trailing arm beam in an abutting engagement with the axle cradle.

3 Claims, 2 Drawing Sheets

U.S. PATENT DOCUMENTS

| | | | |
|---|---|---|---|
| 2,879,076 | 3/1959 | Stricker, Jr. | 280/104.5 |
| 2,879,077 | 3/1959 | Chalmers | 280/124 |
| 2,882,067 | 4/1959 | Gouirand | 280/104.5 |
| 2,952,474 | 9/1960 | Gouirand | 280/113 |
| 3,120,396 | 2/1964 | Nallinger et al. | 280/106 |
| 3,434,707 | 3/1969 | Raidel | 267/31 |
| 3,510,149 | 5/1970 | Raidel | 280/124 |
| 3,707,298 | 12/1972 | Henry et al. | 280/124 |
| 3,773,347 * | 11/1973 | Traylor | 280/124 |
| 3,828,881 | 8/1974 | Owen | 180/75 |
| 3,861,708 | 1/1975 | Fier | 280/124 |
| 4,132,433 | 1/1979 | Willetts | 280/712 |
| 4,195,856 | 4/1980 | Larson et al. | 280/81 |
| 4,261,597 * | 4/1981 | Vandenberg | 280/688 |
| 4,293,145 | 10/1981 | Taylor | 280/704 |
| 4,334,696 | 6/1982 | Bergstrom | 280/725 |
| 4,427,213 * | 1/1984 | Raidel, Jr. | 280/711 |
| 4,465,298 | 8/1984 | Raidel, Sr. | 280/711 |
| 4,494,771 | 1/1985 | Raidel | 280/711 |
| 4,497,507 | 2/1985 | Chervenak | 280/704 |
| 4,501,437 | 2/1985 | Becker | 280/704 |
| 4,506,910 | 3/1985 | Bierens | 280/711 |
| 4,529,224 | 7/1985 | Raidel | 280/711 |
| 4,541,653 | 9/1985 | Raidel | 280/711 |
| 4,566,719 * | 1/1986 | Van Denberg | 280/711 |
| 4,615,539 | 10/1986 | Pierce | 280/690 |
| 4,722,549 | 2/1988 | Raidel | 280/711 |
| 4,741,553 | 5/1988 | Raidel, II | 280/682 |
| 4,762,337 | 8/1988 | Raidel | 280/688 |
| 4,763,923 | 8/1988 | Raidel | 280/704 |
| 4,768,808 | 9/1988 | DeRees | 280/796 |
| 4,902,035 | 2/1990 | Raidel | 280/713 |
| 4,911,417 | 3/1990 | Short | 267/256 |
| 4,991,868 | 2/1991 | Van Denberg | 280/711 |
| 5,002,305 * | 3/1991 | Raidel | 280/711 |
| 5,013,063 | 5/1991 | Mitchell | 280/711 |
| 5,015,004 | 5/1991 | Mitchell | 280/81.6 |
| 5,018,756 | 5/1991 | Mitchell | 280/81.6 |
| 5,037,126 * | 8/1991 | Gottschalk et al. | 280/688 |
| 5,112,078 | 5/1992 | Galazin et al. | 280/711 |
| 5,127,668 | 7/1992 | Raidel | 280/711 |
| 5,375,871 * | 12/1994 | Mitchell et al. | 280/688 |
| 5,536,036 * | 7/1996 | Ehrlich | 280/711 |
| 5,667,240 | 9/1997 | Mitchell | 280/712 |
| 5,690,353 * | 11/1997 | Vandenberg | 280/688 |
| 6,039,336 * | 3/2000 | Frey | 280/124.128 |

\* cited by examiner

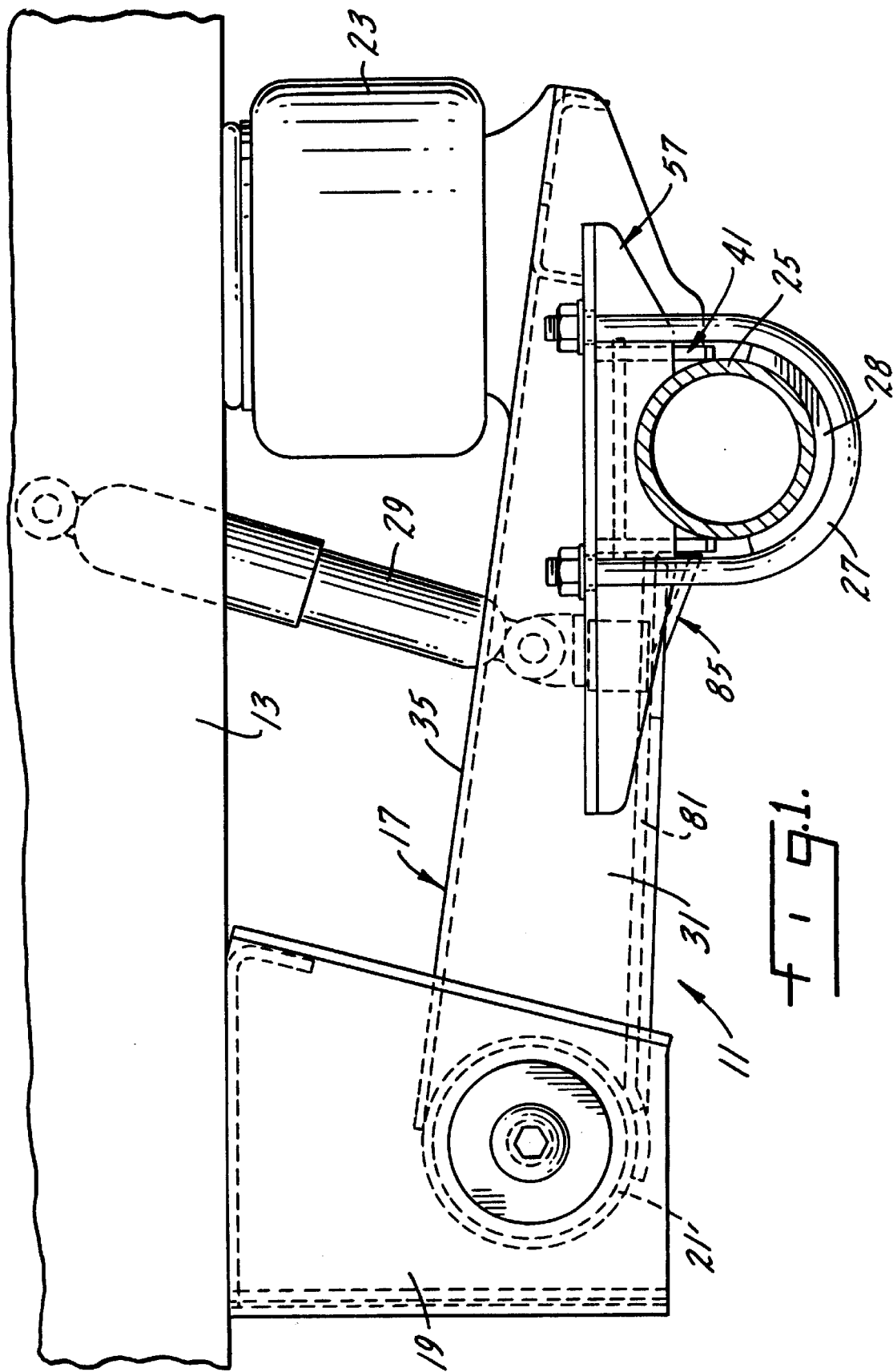

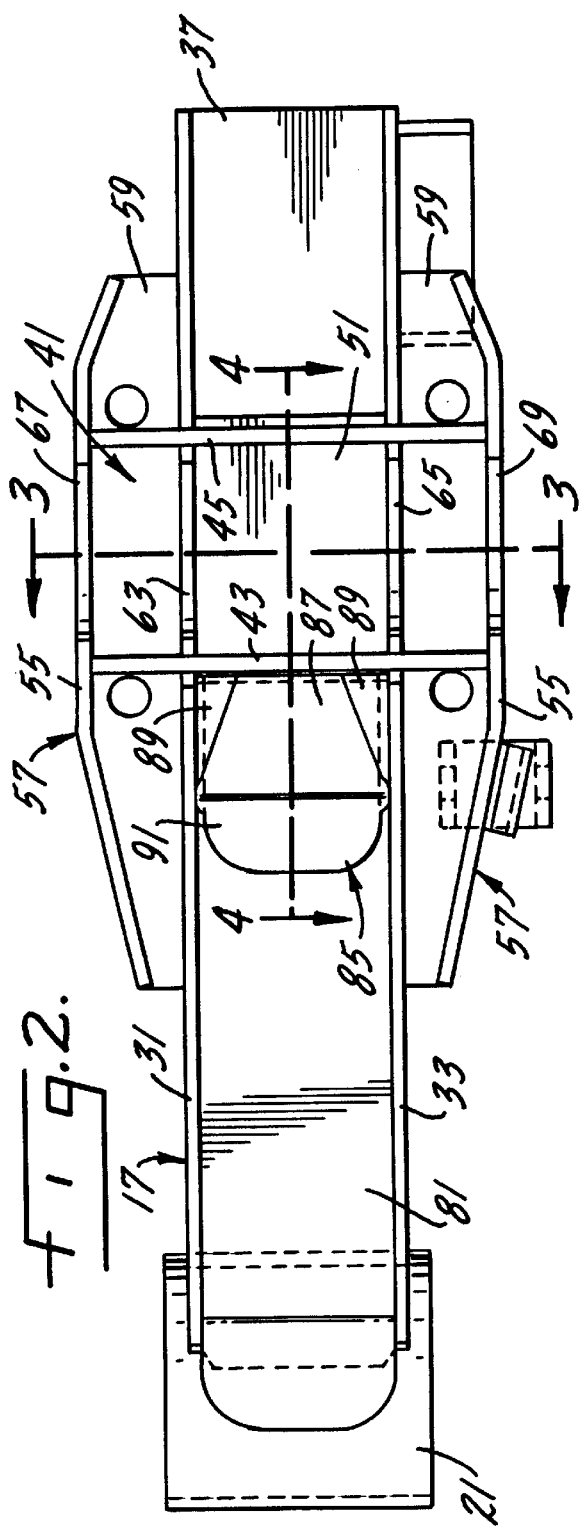
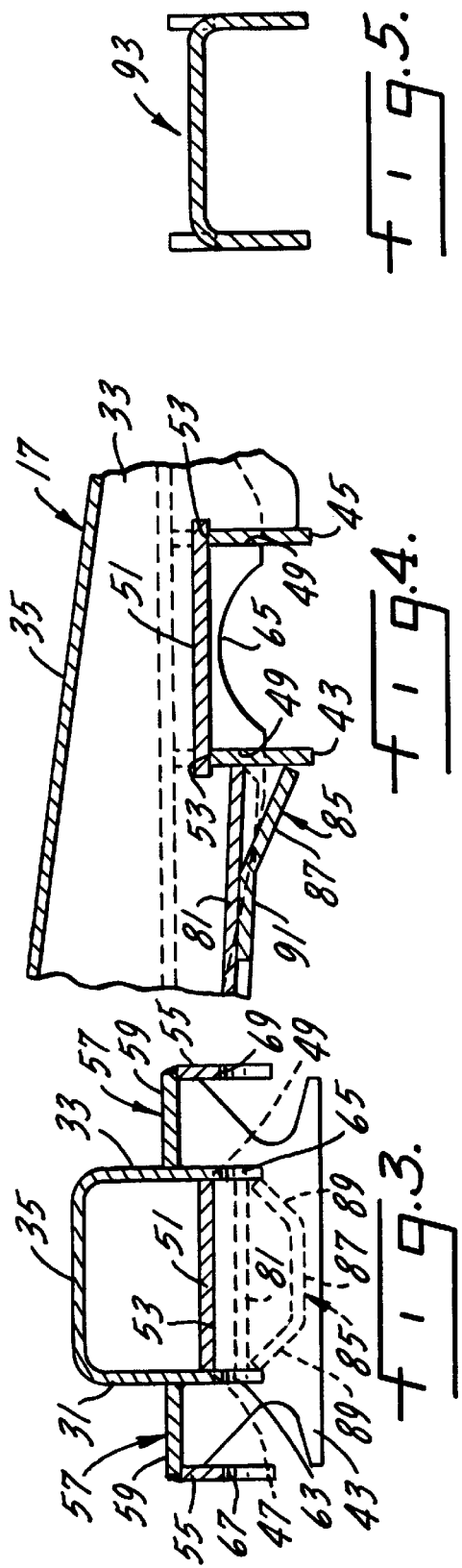

AXLE SUSPENSION SYSTEM FOR A WHEELED VEHICLE

BACKGROUND AND SUMMARY OF THE INVENTION

In vehicles, including trailers, which utilize air ride suspensions, a trailing arm beam is provided on each side of the vehicle to pivotally connect a vehicle axle to the vehicle frame. A conventional trailing arm beam is of U-shape transverse cross section usually bent or otherwise formed from a piece or several pieces of metal. The forward end of each trailing arm beam is conventionally attached to a resilient bushing mounted on a hanger depending from one side of the vehicle frame. The rearward end of each trailing arm beam supports an air bag or air spring which is positioned between the trailing arm beam and the vehicle frame. The vehicle axle is attached to either the top or under side of each trailing arm beam depending upon whether the axle is attached to the vehicle in what is called an overslung fashion or is attached in what is called an underslung fashion. In either of these manners of attachment, the vehicle axle is welded to each trailing arm beam, either directly or indirectly, forming a rigid connection between the axle and each trailing arm beam. Dynamic and static stresses caused by the vehicle load are exerted on the trailing arm beams while the vehicle travels over a road. These stresses may be concentrated at the welds connecting the trailing arm beams to the axle. In such connections, it is desirable to reduce the stress load per linear unit of weld forming the connections between the trailing arm beams and the vehicle axle and to transfer the stress from the welds to the resilient bushings and the air springs.

The present invention is directed to an axle suspension system for a wheeled vehicle which more efficiently transfers stresses from a vehicle axle through trailing arm beams to resilient bushings and air springs supporting the trailing arm beams. A purpose of this invention is to reduce the stress applied per linear unit of weld between the vehicle axle and the trailing arm beams. To obtain this result, the invention utilizes an axle cradle which extends laterally beyond the sides of each trailing arm beam. To further dissipate the stresses, sponsons are attached to each trailing arm beam on opposite sides thereof to provide to additional support to the axle cradle and thus to dissipate the stresses being transferred from the axle cradle over a greater expanse of the trailing arm beams.

Another aspect of the present invention is to more efficiently transfer dynamic and static stresses from the vehicle axle to the resilient bushings supporting the trailing arm beams and to reduce the stresses applied to the air springs. This is accomplished by providing a closure wall for a portion of the normally open side of each of the U-shaped trailing arm beams which closure walls each extends from the resilient bushing of its trailing arm beam to the axle cradle. To assist in this transfer of stresses, a gusset is mounted on the closure wall of each trailing arm beam in engagement with the axle cradle.

Other objects of the invention may be found in the following specification, claims and drawings.

BRIEF DESCRIPTION OF THE DRAWINGS

The invention is illustrated more or less diagrammatically in the following drawings wherein:

FIG. 1 is a partial, side elevational view of an axle suspension system embodying the novel aspects of this invention with some hidden parts shown in dashed lines and some parts shown in cross-section;

FIG. 2 is a bottom plan view of the axle suspension of FIG. 1 with some parts omitted for clarity of illustration and some hidden parts shown in dashed lines;

FIG. 3 is a cross-sectional view taken along line 3—3 of FIG. 2 with some hidden parts shown in dashed lines;

FIG. 4 is a partial, cross-sectional view taken along line 4—4 of FIG. 2 with some hidden parts shown in dashed lines;

FIG. 5 is a cross-sectional view of a modified embodiment of a portion of the axle cradle of FIG. 4.

DESCRIPTION OF THE PREFERRED EMBODIMENTS

FIG. 1 of the drawings shows one side of a suspension system 11 embodying the novel aspects of this invention mounted on a conventional vehicle (not shown) such as a truck or trailer having a longitudinally extending vehicle chassis 13. This illustration shows the left side of the vehicle as the vehicle faces forward and it should be understood that duplicate elements of the suspension system are provided on the other side of the vehicle but are not shown or described herein for clarity of description.

The suspension system 11 includes a trailing arm beam 17 pivotally connected to the vehicle chassis 13 by a hanger 19 through a conventional resilient pivotal bushing 21. An air spring 23 is mounted on the rearward end of the trailing arm beam between the trailing arm beam and the vehicle chassis 13. A transversely extending vehicle axle 25 is mounted to the trailing arm beam by means of U-bolts 27 and a bushing 28 held by nuts in a conventional manner. A shock absorber 29 is mounted between the vehicle chassis 13 and the trailing arm beam.

The trailing arm beam 17 is formed of a U-shaped member preferably by a stamping and/or bending process and has side walls 31 and 33 connected by a cross or connecting wall 35 resulting in an open face 37 which in this example faces downwardly because the vehicle axle 25 is mounted to the chassis 13 in what is called an underslung fashion. It should be understood and appreciated that the trailing arm beam 17 of this invention is constructed so that it may be employed in both underslung and overslung mountings for the vehicle axle without substantial modifications to the trailing arm beam itself. With this in mind, the use of such terms as "upwardly", "downwardly", "top" and "bottom" used in the description of the suspension system are not intended to have any limiting effect on the claimed subject matter. These terms are used solely to describe the trailing arm beam in reference to the orientation of the trailing arm beam 17 shown in the drawing figures.

An important feature of a suspension system for a wheeled vehicle is the connections between the vehicle axle 25 and the trailing arm beam 17 located on either side of the vehicle chassis 13. It is an object of the construction of this invention to minimize stress concentrations where the trailing arm beams are connected to the vehicle axle. In this invention, such a result is accomplished by the unique axle cradle 41 shown in FIGS. 1 through 4 of the drawings. The axle cradle 41 includes a forwardly located crosswall 43 and a rearwardly located crosswall 45, each of which fits respectively in notches 47 and 49 formed in the side walls 31 and 33 of the trailing arm beam 17. A cross panel 51 joins the crosswalls 43 and 45. The panel 51 fits into cutouts 53 formed in the upper portions of the crosswalls 43 and 45. The crosswalls 43 and 45 extend laterally beyond the opposite side walls 31 and 33 of the trailing arm beam 17 to engage outer walls 55 of sponsons 57 mounted on the side walls 31 and 33 of the trailing arm beam. Transversely extending connecting walls 59 extend between the outer walls 55 of the sponsons and the side walls 31 and 33 of the trailing arm beams. Cutouts 63 and 65 in the side walls 31 and 33 of the beams and cutouts 67 and 69 made in the outer walls 55 of the sponsons 57 form a seat for the vehicle axle 25.

A thrust transmitting closure in the shape of a wall 81 is welded across the open face 37 of the trailing arm beam 17 with one end of the closure wall 81 attached to the pivotal bushing 21 and the other end of the closure wall engaging the forward crosswall 43 of the axle cradle. A gusset 85 is welded to the outer surface of the thrust transmitting closure wall 81 and to the forwardly located crosswall 43 of the axle cradle 41 to transmit stresses from the vehicle axle 25 to the resilient pivotal bushing 21. The gusset 85 is formed of an irregular shaped piece of metal having a portion 87 of truncated triangular shape with inclined side walls 89. A flat tab portion 91 is connected at an oblique angle to the base of the truncated triangular shaped portion 87. The gusset is positioned with the truncated tip of the portion 87 connected to the crosswall 43 of the axle cradle 41 and extending at an inclined angle to the thrust transmitting closure wall 81 where its flat tab 91 engages the wall 81. The inclined side walls 89 of the gusset engage the insides of the walls 31 and 33 of the trailing arm beam 17.

As is conventional, the parts of the axle cradle, the sponsons 57, the thrust transmitting enclosure 81 and the gusset 85 are connected to each other by welding. This construction provides a larger number of linear units of welds than is provided in the previous vehicle cradles therefore reducing the stress concentration per unit of weld.

A modified form of the vehicle cradle is shown in FIG. 5 of the drawings in which the individual crosswalls 43, 45 and 51 are substituted by a cradle housing 93 formed in a one piece U-shaped construction.

I claim:

1. An axle suspension system for a wheeled vehicle, including:

a trailing arm beam extending longitudinally along said vehicle, a resilient pivotal bushing attached at a forward end of said trailing arm beam and a spring attached to a rearward end of said trailing arm beam, said resilient pivotal bushing and said spring attached to said wheeled vehicle, said trailing arm beam having a U-shape transverse cross section with a horizontally extending wall joining oppositely located vertical extending walls to define a vertical facing opening thereof in said trailing arm beam, a vehicle axle, and an axle thrust mounting located on said trailing arm beam and spanning said vertically facing opening thereof adjacent said rearwardly located end of said trailing arm beam, said axle thrust mounting including:

an axle cradle mounted on said vertically extending walls of said trailing arm beam and extending transversely across said trailing arm beam, said axle cradle having crosswalls which seat in notches formed in said vertically extending walls of said trailing arm beam, aligned axle receiving arcuate shaped notches formed in said vertical walls of said trailing arm beam, a wall closing a portion of said vertically facing opening of said trailing arm beam, said wall extending from said axle cradle to said pivotal bushing, and a thrust transferring gusset mounted on said closing wall in direct abutting engagement with said axle cradle.

2. The axle suspension system of claim 1 in which said side walls of said axle cradle extend outwardly of said trailing arm beam, a sponson is attached to the outside of each of said vertical walls of said trailing arm beam and is positioned adjacent said axle cradle with each of said sponsons having an outer wall, and said crosswalls of said axle cradle engage said outer walls of said sponsons.

3. The axle suspension system of claim 1 in which said thrust transferring gusset includes an inclined portion extending between a crosswall of said axle cradle and said closing wall and inclined side walls which engage said vertically extending walls of said trailing arm beam.

* * * * *